Dec. 7, 1926.  
T. W. SOWELL  
PORTABLE REFINERY  
Filed Jan. 5, 1925  
1,609,667  
9 Sheets-Sheet 4

Dec. 7, 1926. 1,609,667
T. W. SOWELL
PORTABLE REFINERY
Filed Jan. 5, 1925 9 Sheets-Sheet 5

Inventor
T. W. Sowell
By
Jack R Ashley
Attorney

Patented Dec. 7, 1926.

1,609,667

UNITED STATES PATENT OFFICE.

THOMAS W. SOWELL, OF DALLAS, TEXAS, ASSIGNOR TO THE PORTABLE REFINERY COMPANY, OF DALLAS, TEXAS, A CORPORATION OF DELAWARE.

PORTABLE REFINERY.

Application filed January 5, 1925. Serial No. 467.

This invention relates to new and useful improvements in portable refineries.

The object of the invention is to provide a crude oil refinery composed of a plurality of portable units, whereby a refinery may be set up and operated in a new oil field in less than a month; whereas several months are required to build a stationary refinery.

Another object is to mount the several elements of the refinery on railway cars in such a manner as to be quickly connected for operation.

A further object is to dispose the various elements on the cars in such continuity as to make for the most expeditious assembly of the plant, as well as to make for operation in the most practical and profitable manner.

Another object is to make portable only those parts and elements which it would be profitable to transport and to abandon those parts and elements which may be replaced at a cost less than the cost of removing.

It is obvious that in making the units portable certain provisions must be made and it is not claimed as the invention, the mere portability of the units, but rather the means whereby the units are made portable. However an invention of this character permits of considerable variation in structure and while it is not intended to limit the invention to the hereinafter recited details of construction, there are certain features, which have been found to dominate in a portable refinery. Among these features are: adequate bracing and staying, and suitable heat insulation.

A construction designed to carry out the invention will be hereinafter described together with other features of the invention.

The invention will be more readily understood from a reading of the following specification and by reference to the accompanying drawings, in which an example of the invention is shown, and wherein.

In the drawings the numeral 25 designates a railway flat car and 26 a railway box car which comprise the two units of my portable refinery. These cars are preferably of the steel frame type and are suitably reinforced to carry their respective loads. The car 25 constitutes the vaporizing and condensing unit; while the car 26 constitutes the storage and power plant unit.

On one end of the car 25 is mounted a shell still 27 illustrated in detail in Figs. 3 to 9 inclusive. The still has a heat insulating jacket 28, a rounded or arched top 29, vertical sides 30 and a rounded bottom 31. A fire box 32 underlies the still and comprises longitudinal side walls built up of upright metal studs 33 supporting longitudinal metal beams 34. Brackets 35 secured to the still rest upon the beams and support the still. The panels formed by the studs, beams and floor of the car are filled with bricks 36.

At the front end of the still is a transverse burner manifold 37 into which gas or oil burners 38 extend. From each side of the manifold tubular flues 39 lead through the still, a burner being positioned relatively axially of each flue. The flues extend through the rear end 40 of the still into a transverse housing 41. The housing has a transverse arch 42 bridging the rear ends of longitudinal baffle walls 43 extending from the floor of the fire box to the bottom 31 of the still and inclined inwardly. The flues, arch and baffle walls are preferably made of non-metallic fire resisting material, such as a mixture of fire clay and asbestos fibre and the like.

Figure 9:
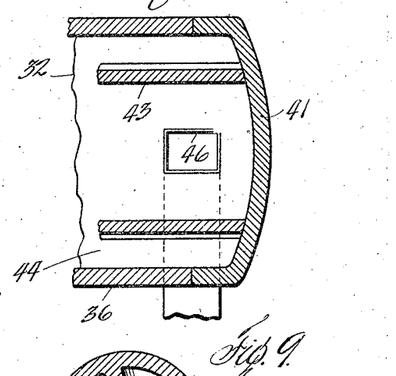
Fig. 9 is a partial horizontal cross-sectional view of the rear end of the still.
Figure 10:
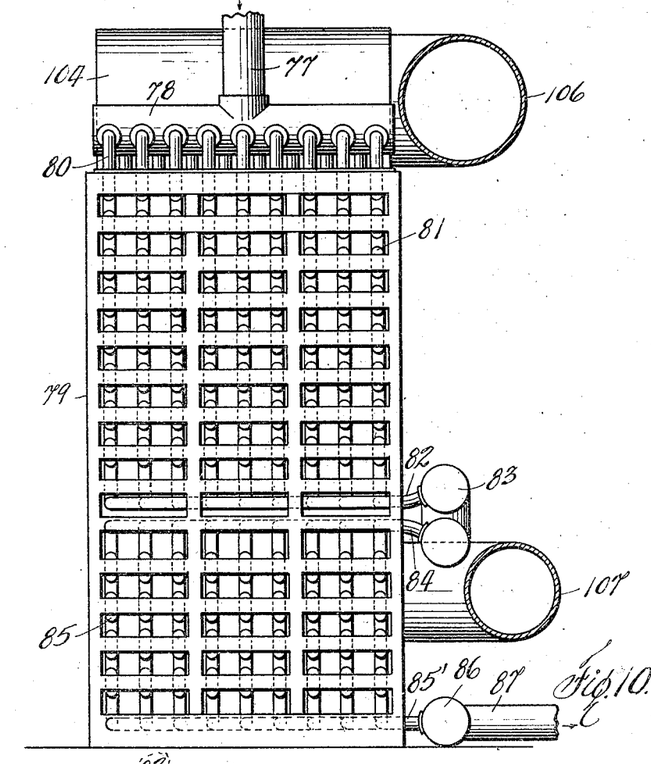
Fig. 10 is an end elevation of the air condenser.
Figure 11:
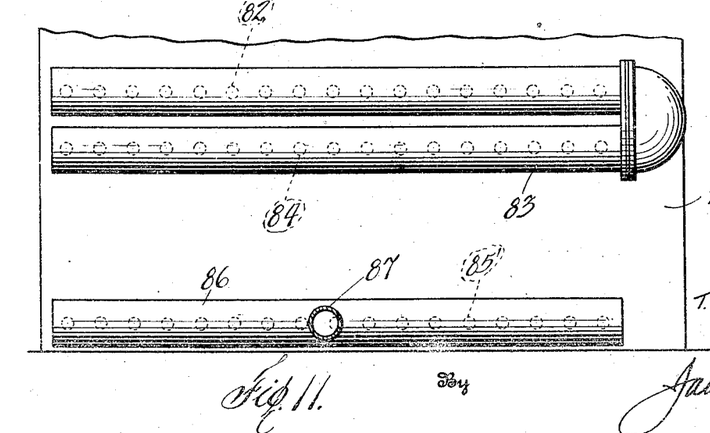
Fig. 11 is a partial side elevation of the same.
Figure 12:
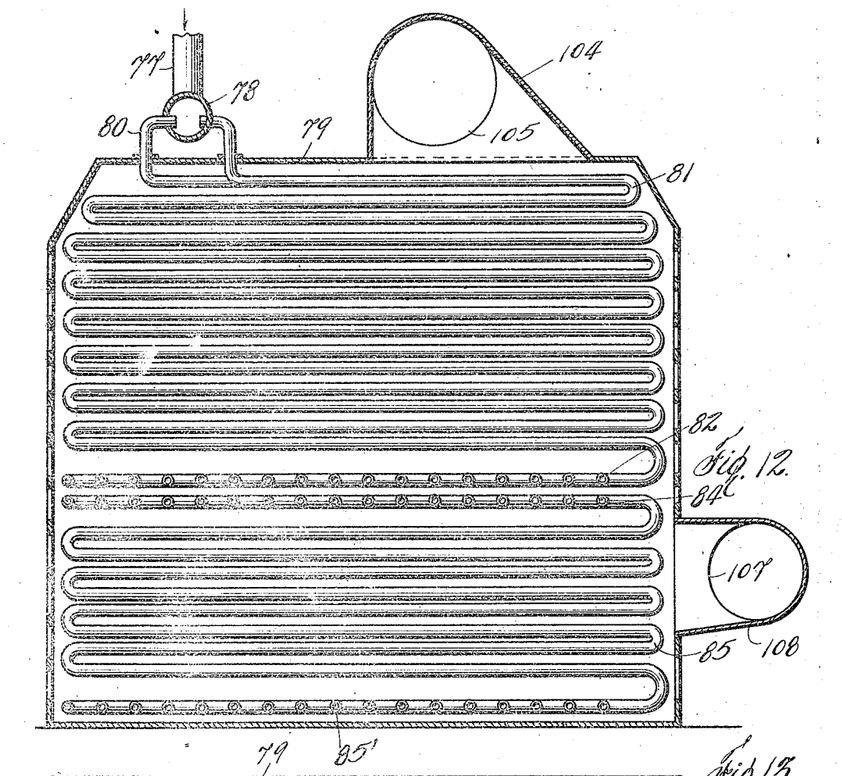
Fig. 12 is a vertical sectional view of the air condenser.
Figure 13:
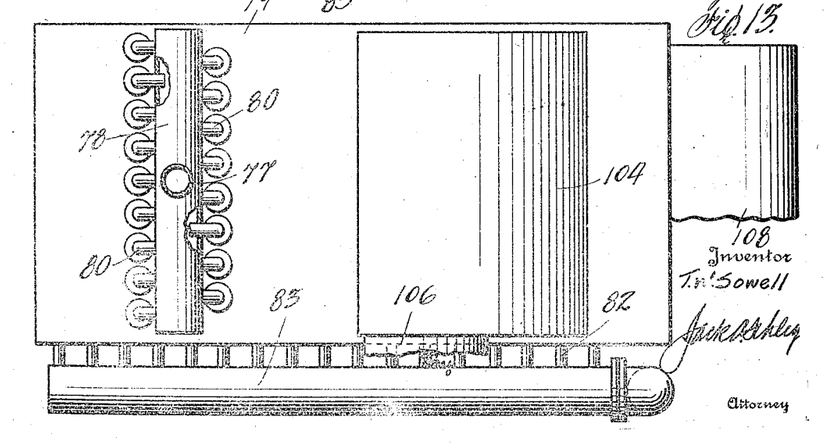
Fig. 13 is a plan view of the same.

The products of combustion are forced through the flues from the manifold 37 to the housing 41. From the housing the products are drawn along the passages 44 or channels formed between the side walls of the fire box and the baffle walls to the front, and then around the front ends of said walls 43, (Fig. 8) into a central flue 45 underlying the bottom 31 and closed at its rear end by the housing 41 (Fig. 9.) A smoke pipe 46 having an elbow leads from the bottom of the fire box at the rear end of the flue 45 and is connected to a smoke stack 47 erected on the ground at the side of the car. By this handling of the products the still is thoroughly heated and the full benefit of the heat is had before the products escape into the stack 47. The pipe 46 is placed under the car and the stack is built after the location has been selected.

Figure 14:
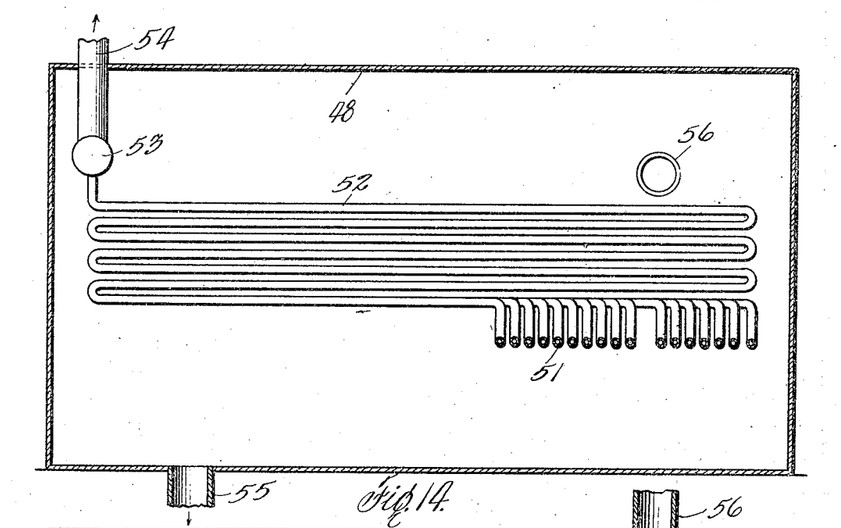
Fig. 14 is a vertical sectional view of the heat exchanger.
Figure 15:
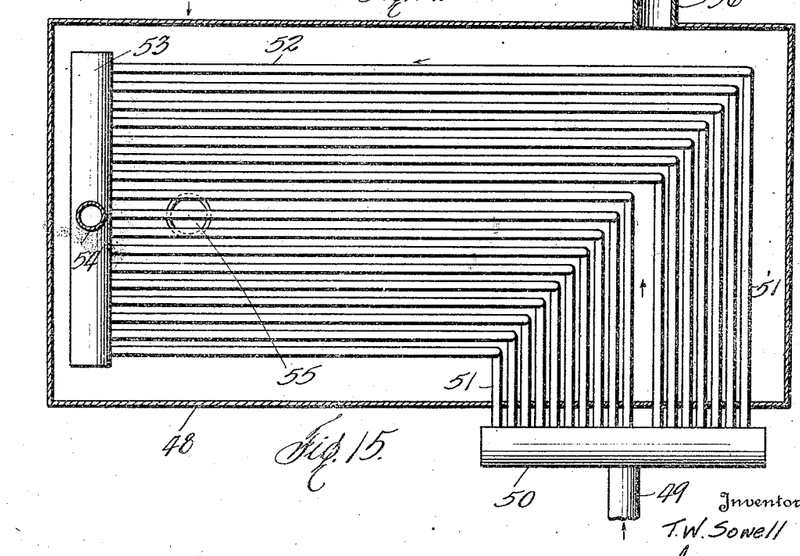
Fig. 15 is a cross-sectional view of the same.

A heat exchanger, shown in detail in Figs. 14 and 15, is mounted on the car 25 next to the still. The exchanger comprises a casing 48. A crude oil feed or supply pipe 49 is led up to the heat exchanger, after the car as been placed, and is connected to a horizontal manifold 50. From the manifold a plurality of small distributing pipes 51 enter the side of the casing and are continuous with coils 52 in said casing. The coils are connected to a horizontal manifold 53 in the casing at the opposite end. A feed pipe 54 leads from this manifold through the top of the casing and enters the top 29 of the still near its front end.

A by pass pipe 55 leads out of the bottom of the still near the pipe 46 and enters the bottom of the heat exchanger casing 48 at the adjacent end. Hot oil from the still is thus supplied to the exchanger and the coils 52 immersed therein. An overflow pipe 56 extends from the side of the casing 48 to the rear end of the still. It will be seen that the crude oil upon entering the manifold 50 is split up and conducted through the exchanger in the small coils 52. This subjects relatively small streams of the oil to the heat of the hot oil in the exchanger, whereby the conducted oil is heated and expanded. The small streams of oil are again collected in the manifold 53 and conducted through the pipe 54 to the still 27. The oil delivered to the still is thus preheated and is more readily vaporized. A surplus of oil from the casing 48 may be pumped out through the pipe 57 and conveyed to a suitable cooling box (not shown).

One of the very important features of the equipment is a cooling tower mounted on the still and comprises a rectifying column 58 surmounted by a dephlegmator 59. While this tower may assume various forms, that illustrated and described has been found very satisfactory. The column 58 has an inlet collar 60 connecting its bottom with the top 29 of the still. The vapors arising from the still pass into the bottom of the rectifier. A plurality of traps are provided at the lower end of the rectifying column and each comprises a pan 61 having its upper edge spaced below a baffle ring 62 secured to the inner cylindrical wall of the column. Each ring has an internal depending apron 63 extending to the pan and supporting a screen 64. The condensed liquids falling in the column will pass through the upper screen and overflow from the upper pan to the lower pan any liquid overflowing from the lower pan will be drained back into the still by a pipe 65.

Thus the vapors rising from the still must pass under the rings 62 and through the liquid in the upper portions of the pans, as well as through the screens. This will condense the heavier products which would otherwise pass up the column.

Figure 22:
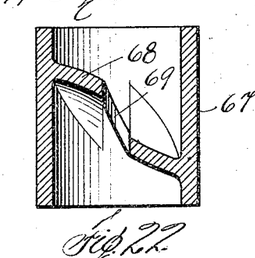
Fig. 22 is a vertical sectional view of one of the chemical rings used in the cooling tower.
Figure 23:
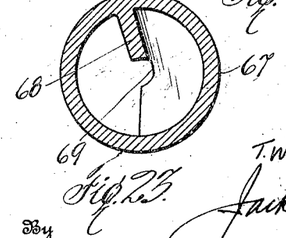
Fig. 23 is a cross-sectional view of the same.

Above the upper pan a perforated partition 66 is secured across the column. That portion of the column above the partition is filled with chemical rings 67, shown in detail in Figs. 22 and 23. These rings are made of plastic material and burned in a kiln. Each ring has a sinuous transverse baffle 68 provided with a central aperture 69. These rings are set end upon end or laid in the tower in any suitable manner, the idea being to sufficiently retard the rising vapors, to condense the heavier products and permit only the more volatile vapors to pass.

At its upper end the column is joined to the bottom of the dephlegmator 59 which consists of a plurality of vertical tubes 70 having upper and lower ends supported in partitions 71 and 72 respectively. These tubes are divided into three sections or groups A, B and C respectively, by upright partitions 73 extending between the partitions. The lower ends of the tubes of group A are exposed to the vapors rising from the column, while the lower ends of the tubes of the other groups are segregated by a transverse deflector plate 74. At the top of the dephlegmator the space above the partition 71 is divided by a transverse wall 75, which separates the upper ends of the tubes of group C from the other groups. Thus the vapors passing up through the tubes of group A may pass down the tubes of group B and will be conducted by the plate 74 to the tubes of group C. The vapors passing up the tubes of group C escape into an elbow 76 leading from the top of the dephlegmator. Any suitable cooling fluid may be circulated around the tubes in the space between the partitions 71 and 72, whereby the vapors passing the tubes are subjected to the cooling influence of the said fluid. The highly volatile vapors passing out of the elbow 76 are ready for condensing into liquid. In the rectifier the heavier and least volatile vapors are retarded and condensed; while in the dephlegmator a separation between the light and less volatile vapors is effected by a cooling agent.

The vapors passing out through the elbow 76 are conducted down through a vertical pipe 77 to a manifold 78 over a condenser housing 79 mounted on one end of the car 25. Tubular connections 80 (see Figs. 10 to 13) lead from each side of the manifold to upper coils 81 in the condenser housing. The coils have connections 82 leading through the side of the housing to a U-shaped manifold 83, from the lower leg of which connections 84 lead back into the housing and are attached to a lower coil 85. Connections 85' lead from the coil 85 at the lower end of the condenser to an exterior manifold 86. A pipe 87 leads from the manifold 86 to the receiving house not shown. The housing 79 is perforated at its ends and the ends of the coils are adjacent these perforations.

In the box car 26 is mounted a gas or gasoline engine 88 having a driving pulley 89 which drives a pulley 90 on a jack shaft 91 by means of a belt 92. A water cooling tank 93 for the engine is mounted on the side of the car and is suitably connected with the cooling system of the engine. A low pressure blower 94 is driven by a belt 95 from a pulley 96 on the jack shaft 91. A pipe 97 is connected with this blower and leads to the burners 38 for atomizing the fuel therethrough. A high pressure suction fan 98 is mounted in the end of the car 26 adjacent the car 25. This fan is driven by a belt 99 from a pulley 100 on the jack shaft 91. An electric generator 101 for power and light is driven by a belt 102 from a pulley 103.

Air suction is employed as a cooling agent in the dephlegmator 59 and the condenser, but any other cooling fluid or means could be used. The condenser housing 79 (Figs 10 to 13) has a transverse hood 104 extending across the top and opening into the housing. A right angular duct 105 is coupled to a collar 106 at the rear end of the hood. This duct extends down one side of the fan 98 and is connected to the side of the fan casing at the center thereof. The fan creates an air suction through the duct. The lower end of the duct is connected by a curved pipe 107 with a manifold 108 on the side of the housing 79. The walls of the housing being perforated as described the suction created in the duct will draw air through housing and the collar 106 and the pipe 107. The air drawn through the collar will pass between the lower coils 85; while the air drawn through the pipe 107 will pass between the upper coils 81. This will dissipate the heat by setting up a circulation, whereby more rapid radiation is effected.

Figure 1:
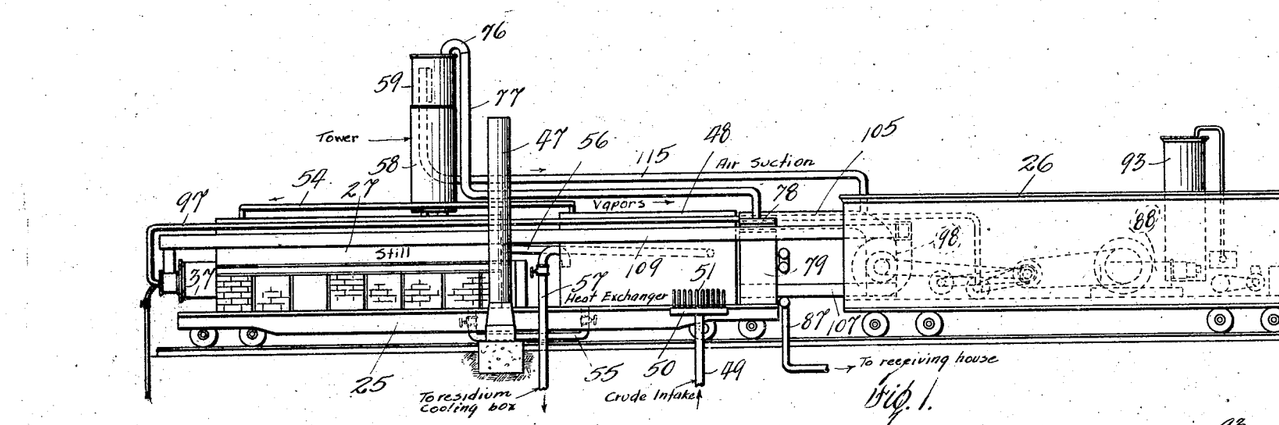
Fig. 1 is an elevation of a pair of cars connected up and ready for operation, in accordance with my invention.
Figure 2:
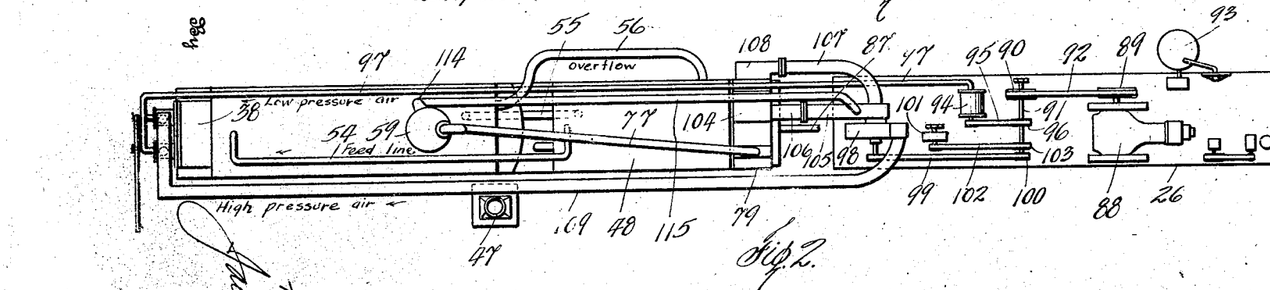
Fig. 2 is a plan view of the same.
Figures 3, 4:
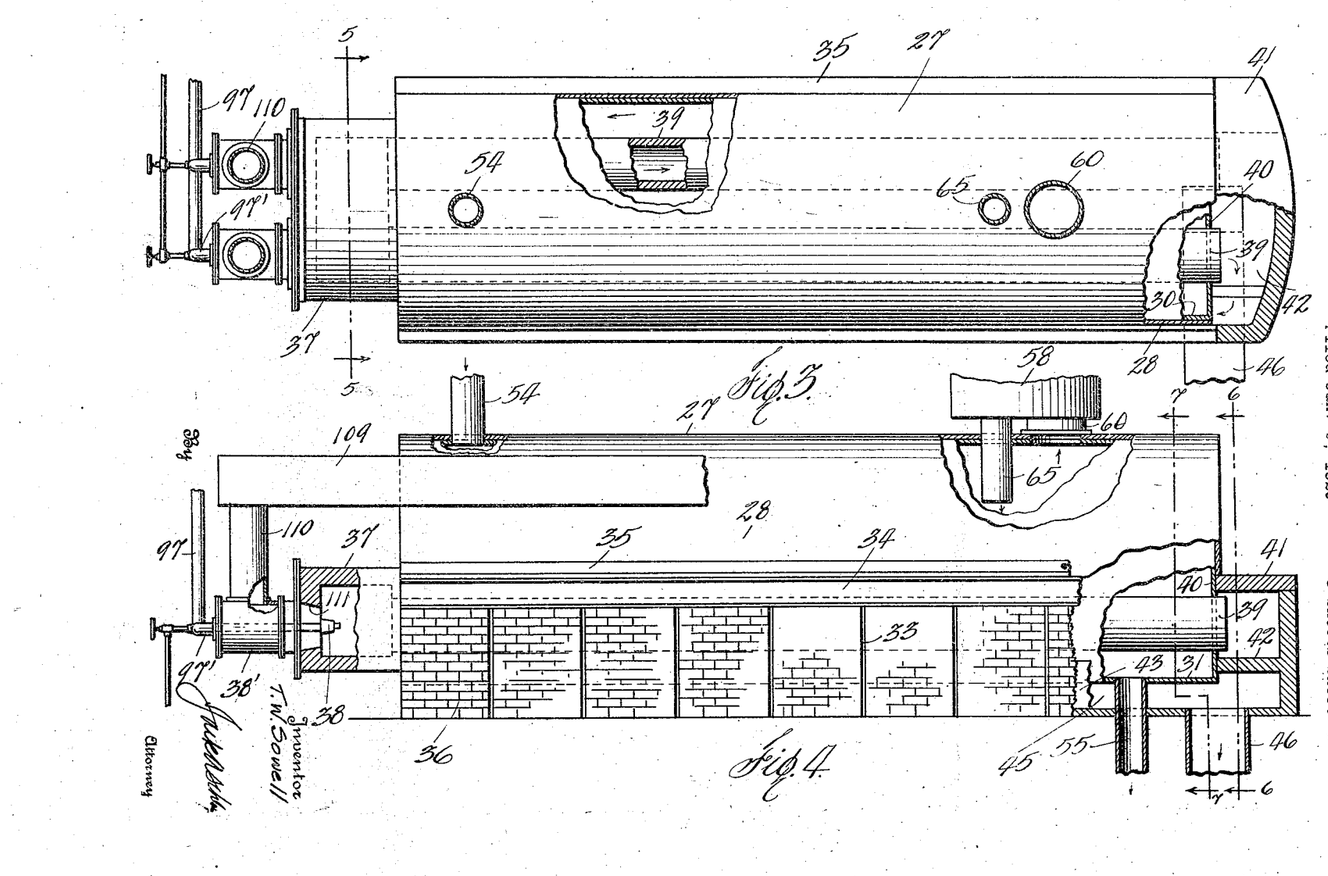
Fig. 3 is a plan view of the still.
Fig. 4 is a side view partly in section.
Figures 5, 6, 7:
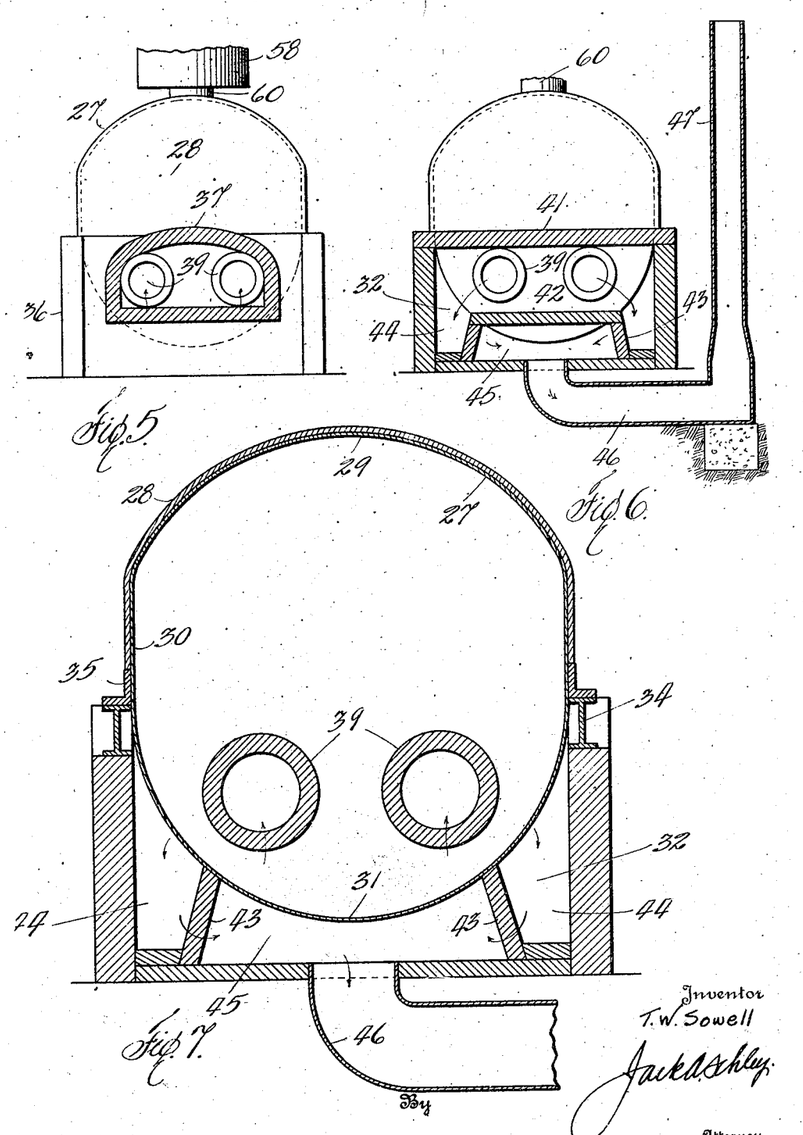
Fig. 5 is a transverse vertical sectional view taken on the line 5—5 of Fig. 3.
Fig. 6 is a transverse vertical sectional view taken on the line 6—6 of Fig. 4.
Fig. 7 is a transverse vertical sectional view taken on the line 7—7 of Fig. 4.
Figure 8:
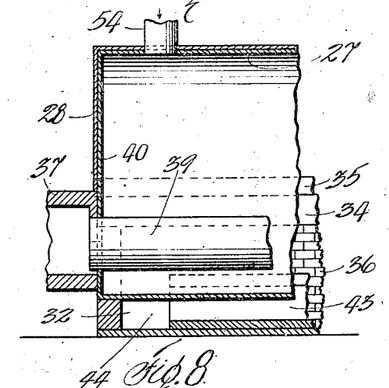
Fig. 8 is a vertical sectional detail of the front end of the still.

The air sucked into the fan will be more or less hot and this heated air is expelled into a pipe 109 (Fig. 2) which leads to the burner 38. Each burner is surrounded by a large sleeve 38', each fed from the pipe 109 (Figs. 2 and 4) by a depending branch pipe 110. The low pressure pipe 97 is connected to atomizing tubes 97' which pass through the sleeves and project through flaring openings 110 in the front wall of the manifold 37. By this arrangement low-pressure air is supplied directly from the blower 94 to the burners for atomizing the fuel oil or mixing with gas. High pressure hot air is copiously supplied to the sleeves 38' from the fan 98. The sleeves and opening 111 being large admit the hot air in sufficient volume to provide a forced draft directed into the tubular flues 39.

Figures 16, 17, 18, 19:
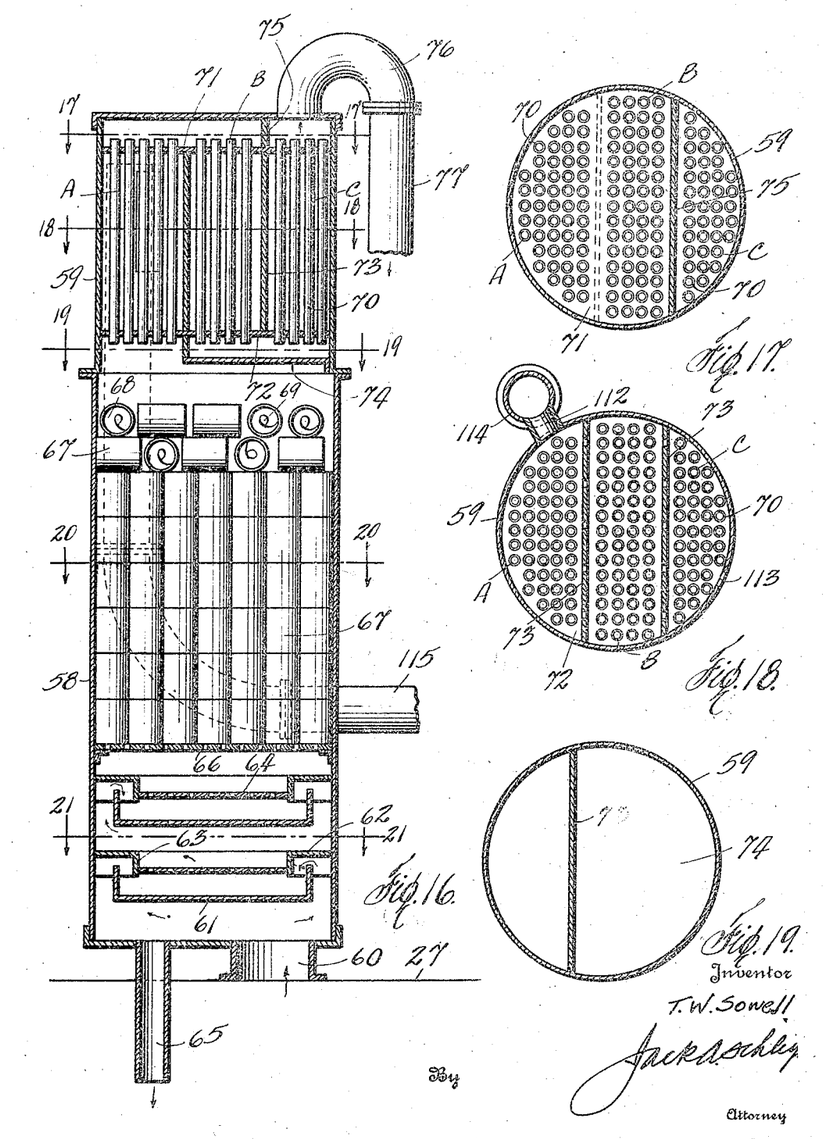
Fig. 16 is a vertical sectional view of the cooling tower.
Fig. 17 is a cross-sectional view on the line 17—17 of Fig. 16.
Fig. 18 is a cross-sectional view on the line 18—18 of Fig. 16.
Fig. 19 is a cross-sectional view on the line 19—19 of Fig. 16.
Figures 20, 21:
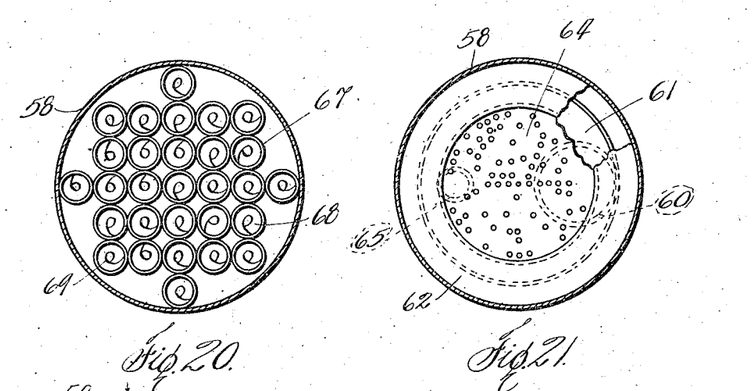
Fig. 20 is a cross-sectional view on the line 20—20 of Fig. 16.
Fig. 21 is a cross-sectional view on the line 21—21 of Fig. 16.

The dephlegmator 59 is provided with an elongated vertical opening or slot 112 in one side and one or more similar openings 113 on the opposite side, through which air may enter. A head 114 (Fig. 18) is connected with the opening 112 and a pipe 115 leads from the head. This pipe has its rear end tapped into the top of the duct 105. By this arrangement air is drawn through the dephlegmator and passing between the tubes 70, will cool the same.

Figure 24:
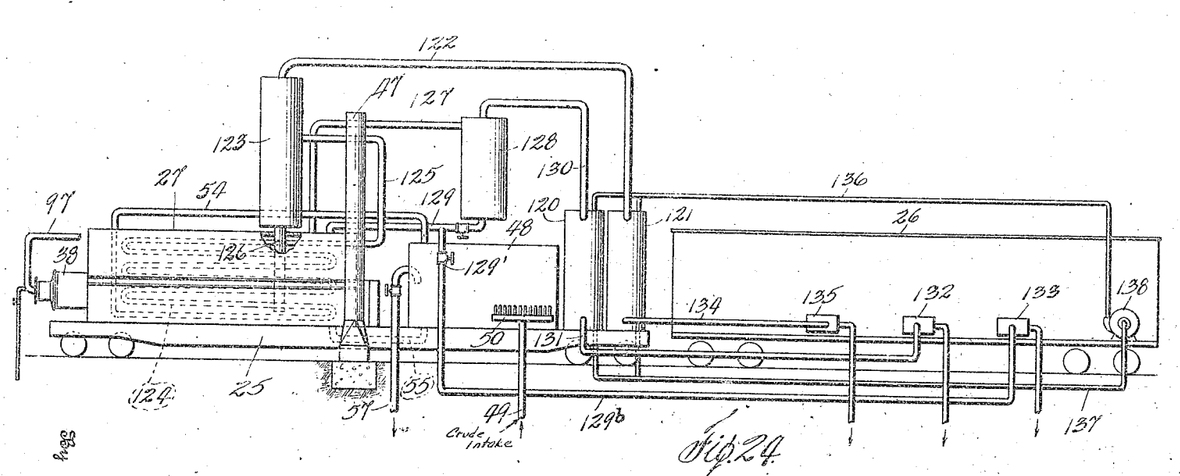
Fig. 24 is a side elevation of a modified form of portable refinery.
Figure 25:
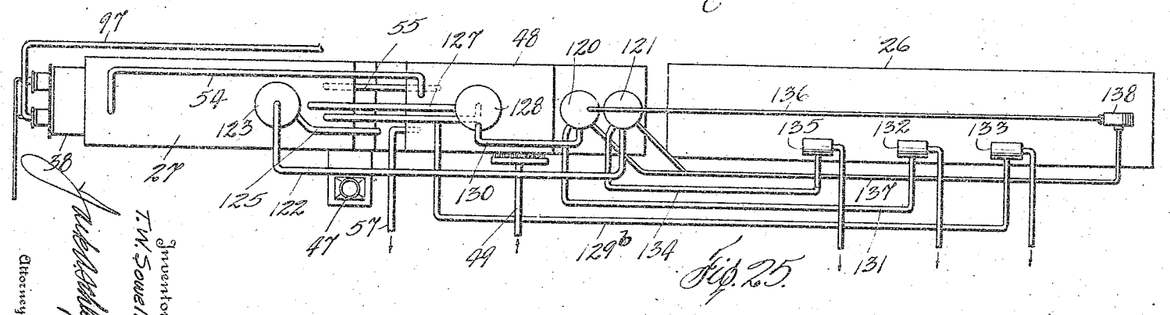
Fig. 25 is a plan view.

It is obvious that various changes in the arrangement and the particular elements of the equipment, within the scope of the appended claims may be made. As an illustration I have shown a modification in Figs. 24 and 25. In this form substantially the same still 27 is mounted on the car 25, although its interior may be varied. In these figures like numbers denote the same parts as in the other figures. Instead of the air condenser and the high pressure fan, a pair of water cooled condensers 120 and 121, respectively, are mounted on the car 25.

A pipe 122 leads out of the top of the tower 123 to the top of the condenser 121. The pipe 54 which leads out of the heat exchanger casing 48 enters the still 27 and is connected with coils 124 extending longitudinally thereof. A pipe 125 leads from the rear end of the coils, up through the still to the tower 123. The tower may be any approved structure or it may be similar to the rectifying column 58. The oil which enters the upper portion of the tower flows back into the still through a large pipe 126, through which the vapors also rise into the tower.

A pipe 127 leads from the still to the top of an axially rectifier 128 and return pipe 129 leads from the bottom of said rectifier to the top of the still. Vapors from the still will pass up through the pipe 127 to the rectifier 128 and the liquid condensed will back through the pipe 129. The liquids may either be drawn off through a discharge pipe 129$^b$ including a cut-off valve 129' or they may be carried back to the still. The vapors from the rectifier 128 pass out through a pipe 130 to the condenser 120, from which the condensed liquids are conducted by a pipe 131 to a pump 132, located in the car 26. The pipe 129$^b$ leads to a pump 133 in the car 26. A pipe 134 leads out of the bottom of the condenser 121 to a pump 135.

The condensers are cooled by water and supplied by a pipe 136 from a suitable cooling tower (not shown). The water returned to the tower by a pipe 137 in which is connected a pump 138 located in the car 26. The advantage of this arrangement over the air cooled system is that a lower condensing temperature may be obtained and a higer grade of hydrocarbon oil secured. The most expensive and complex elements of the refining being mounted on the cars, the plant is readily transportable. It requires months to build a pipe line from a field and months to build a refinery. Within two or three weeks after arriving at the field the refineries herein described may be connected up and operating, thus saving thousands of dollars, which would otherwise be expended in transporting the crude oil to refineries, by tank cars.

What I claim, is:

1. In a portable refinery unit, a crude oil still, a heat exchanger having a crude oil inlet, means for circulating heated oil from the still through the exchanger and returning it to the still, a pipe for conducting heated oil from the exchanger discharging directly into the still, a cooling tower connected with the still, and a vapor discharge pipe from said tower.

2. In a portable refinery unit, a crude oil still, a heat exchanger having inlet and outlet manifolds connected by a series of pipes, means for circulating heated oil from the still through the exchanger and returning it to the still, a feed from the outlet manifold to the still, and a cooling tower connected with the still and having a vapor discharge pipe.

3. In a portable refinery unit, a crude oil still, a heat exchanger having inlet and outlet manifolds connected by a series of pipes, means for circulating heated oil from the still through the exchanger and returning it to the still, a feed from the outlet manifold to the still, a cooling tower connected with the still and having a vapor discharge pipe, and a liquid drain from said tower to the still.

4. In a portable refinery unit, a crude oil still, a heat exchanger having a crude oil inlet, feed and return connections from the liquid within the still through the exchanger for heating the same, a pipe for conducting oil from the exchanger inlet to the liquid within the still, a cooling tower connected with the still, a vapor discharge from said tower to a condenser, and a drain from the tower to the still.

5. A refinery unit comprising a portable support, a crude oil still mounted thereon and having a fluid burner, an associated heat exchanger connected by feed and return pipes with the fluid body within the still and also having a crude oil passage, a feed pipe for conducting heated oil from the passage to the still, a cooling tower mounted on the still and connected therewith and comprising a rectifying column and a dephlegmator, a vapor discharge pipe leading from the dephlegmator to a condenser, and a coupled portable unit having power means connected to supply air under pressure to the still burner and condenser.

6. A refinery unit comprising a portable support having a still thereon with a fluid burner, a heat exchanger connected for feeding crude oil to said still, a cooling tower thereon connected for refining liquids, and a condenser having temperature controlling means, and a second portable support coupled to the first support and having a power plant mounted thereon with conducting pipes to supply air under pressure to the still burner and cooling tower, and a temperature controlling medium to the condenser.

7. In a portable refinery unit, the combination with a support, of a shell still mounted at one end of the support longitudinally thereof, a heat exchanger mounted on the support adjacent the still, means for supplying hot liquid from the still to the exchanger and returning the same to the still, means for passing liquid through the exchanger without mixing with the hot liquid, whereby said conducted liquid is heated, means for conducting the heated liquid to the still, a cooling tower above the still connected therewith, a vapor pipe leading to the top of the tower, a condenser connected with the vapor pipe, and mounted on the support, and a discharge pipe leading from the condenser.

8. In an oil refinery, a still and means for heating the same, a heat exchanger, a feed pipe from the lower portion of the still to the base of the exchanger, a return pipe from the upper portion of the exchanger to establish circulation with the still, a crude oil feed comprising vertical coils disposed beneath the return connection, and a pipe from said coils discharging into the upper portion of the still.

In testimony whereof I affix my signature.

THOMAS W. SOWELL.